Feb. 13, 1962   L. SILVA   3,020,826
COOKING UTENSIL
Filed Oct. 26, 1959

INVENTOR.
Luis Silva.
BY
Fishburn & Gold
ATTORNEYS.

United States Patent Office 3,020,826
Patented Feb. 13, 1962

1

3,020,826
COOKING UTENSIL

Luis Silva, % Spanish Gardens, 1349 S. 26th St., Kansas City, Kans.

Filed Oct. 26, 1959, Ser. No. 848,786
1 Claim. (Cl. 99—426)

This invention relates to a cooking utensil, and more particularly to a holder for preparing the shells in the making of Mexican food known as "tacos."

In the formation and preparation of tacos there is involved the formation or molding and then frying of the taco shell while held in a folded or U-shaped formation. While held in this U-shaped formation they are placed in a deep fat and fried to a crisp condition. They are then ready to be filled with a suitable edible filling for consumption. Various methods have been devised for holding tacos while frying. Such methods have been tedious and not entirely satisfactory for the purpose, and requiring constant watching while cooking. The taco material requires careful handling during the cooking.

The principal object of the present invention is to provide a utensil including a handle section having handle members and a frame section having laterally turned arms upon the ends of which are tacos holding members nesting one within the other whereby the taco is formed around one of the holding members and the other holding member enfolds thereover by the spring of the handle members to hold the taco in folded condition while being cooked.

Other objects of the present invention are to provide a frame section and a handle section for the tacos holding members made from a single piece of spring wire or the like and having a coil formed at substantially the center of the wire and forming two handle members movable generally in the same plane which are bent at right angles toward each other forming frame section arms and then turning outwardly in axial alignment with the handle section and then downwardly or laterally of the handle members and thence outwardly in the same direction as the handle forming frame section portions to which the taco holding members are secured, whereby pressing of the two parallel handle members toward each other will separate the taco holding members so that the taco may be wrapped around one of the members and the other member will be held enclosed thereover upon release of the handle members and maintain this position while the taco is being cooked.

Still further objects of the invention are to provide a cooking utensil for holding and frying articles in deep fat in a container or the like whereby the article being cooked may be placed in the deep fat and the utensil holding the article engages the top edge of the container to hold the utensil thereon without the aid of the user during the cooking operation; and to provide a device of this character simple and economical to manufacture.

In accomplishing these and other objects of the invention I have provided improved details of structure, the preferred forms of which are shown in the accompanying drawings, wherein.

Referring more in detail to the drawings:

1 designates a cooking utensil embodying the features of my invention, preferably made from wire or like material and having a handle section 2 and having nesting taco holding members 3 and 4 of substantially U-shape form secured to a frame section 5 of the utensil as will later be shown.

2

Figure 1:
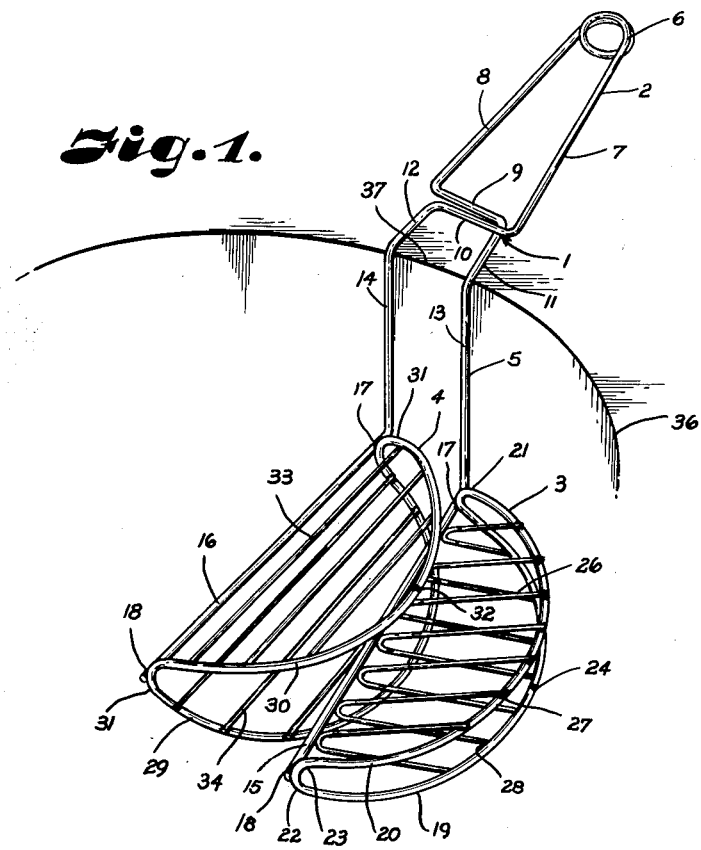
FIG. 1 is a perspective view of my cooking utensil in an open position for receiving a taco.
Figure 2:
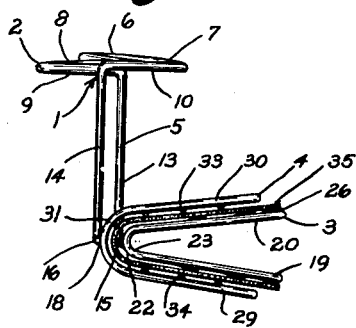
FIG. 2 is an end view showing the taco engaged between the two holding members in condition for cooking.

The handle section 2 and frame section 5 are made from a one-piece wire structure which is coiled at substantially the center 6 thereof, to provide a spring or resiliency in the handle section 2. The handle section 2 is comprised of horizontally extending handle members 7 and 8 as seen in FIG. 1. The frame section 5 includes arms 9 and 10 which are actually extensions of the handle members 8 and 7 respectively. The arms 9 and 10 extend horizontally toward each other. The arms 9 and 10 are then turned approximately at right angles and have portions 11 and 12 that extend substantially in planes defined by the respective handle members 7 and 8 and arms 9 and 10, said portions 11 and 12 extending from the arms 9 and 10 respectively in a direction substantially opposite from that of the handle members 7 and 8. The arm 10 tapers slightly upwardly and extends over the arm 11 adjacent the juncture of arms 9 and 11 as shown in FIG. 2. The arms or portions 11 and 12 then turn at approximately right angles downwardly or vertically as indicated at 13 and 14. The portions 13 and 14 of the frame section 5 then make another approximate right angle turn so as to again extend horizontally outwardly and normally alongside each other (FIG. 2) forming arms 15 and 16. The taco holding members 3 and 4 described more fully hereinafter, are secured by welding or other suitable means respectively to the arms 15 and 16, as indicated at 17 and 18, FIG. 1.

The taco holding members 3 and 4 are of substantially semi-circular contour when viewed in plan and substantially U-shaped when viewed in side elevation, as best illustrated in FIG. 2, but with their sides tapering slightly outwardly. The holding member 3 comprises spaced arms 19 and 20 having their ends 21 and 22 secured to the arm 15 as previously described. The spaced arms 19 and 20 may be made from a single piece of wire or the like and looped as each end, as indicated at 23, and the free ends of the wire welded together at the weld 24.

The taco holding member 3 has a plurality of parallel spaced U-shaped wires 26 engaging between the arm 15 of the frame section 5 and the semi-circular spaced arms 19 and 20 of the holding member 3, with one free end of the wires 26 being welded or otherwise suitably secured to the outside of the arm 20, as indicated at 27, and the other free end of the wires being secured to the outside of the arm 19, as indicated at 28. The arms 19 and 20 are bent to a U-shaped form with their outer ends spaced apart, but the connecting end or U-portion at 23 substantially close together. The U-shaped wires 26 form a U-shaped supporting surface for the taco.

The semi-circular taco holding member 4 has spaced substantially semi-circular arms 29 and 30 which may be formed from a single piece of wire with the ends of the arms looped as at 31 and secured to the arm 16 by welding or other suitable means and the free ends of the wire welded together, as indicated at 32 (FIG. 1). Extending parallel with the arm 16, and secured to the inside of the semi-circular arms 29 and 30, are spaced wires 33 and 34 forming an additional U-shaped supporting surface for the taco. It will be noted that the wires 33 and 34 run transversely to the U-shaped wires 26 on the taco holding member 3. The supporting surfaces formed by the wires 33, 34 and 26 cooperate to fashion a mold for the taco in uncooked condition and to hold the same during the cooking period and will grip the sides of the taco to withdraw the same from the member 3.

Figure 3:
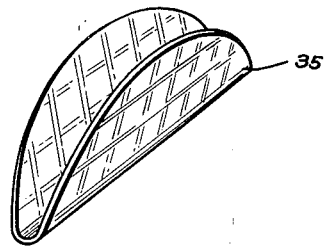
FIG. 3 is a perspective view of a taco shell.

The uncooked taco 35 is formed in a flat condition from the usual ingredients and when applied to the member 3 is of the shape shown in FIG. 3. The user of the cooking utensil grasps the handle section 2 with one hand and by exerting pressure on the handle members 7 and 8 toward each other against tension of the spring at 6 and the taco holding members 3 and 4 will be spread apart.

With his other hand the user wraps the taco around the holding member 3, and it is thus formed in a U-shaped condition. Release of pressure on the handle section 2 or handle members 7 and 8 will cause the taco holding members 3 and 4 to move toward each other and the member 4 to extend over the tacos in its position over the taco holding member 3, as illustrated in FIG. 2, so that the taco is nested within the holding member 3 in condition for cooking. The resiliency of the coil or spring at 6 will hold the member 3 with the taco thereon in position within the member 4 during such cooking operation.

The container 36 is then filled to a substantial depth with a cooking oil or the like (not shown) and the frame portion and taco holding members placed with the taco therein in the container with the frame section 5 at 11 and 12 resting upon the edge 37 of the cooking container 36 so that it is not necessary for the user to hold the utensil during the cooking operation.

When the taco is cooked to a crisp condition it may be removed from the cooking oil by merely raising the utensil by grasping the handle section 2 and again placing pressure on the handle members 7 and 8 to separate the taco holding members 3 and 4. The taco may then easily be removed from around the holding member 3 so that the utensil may be again ready to use. The taco dough being slightly soft when placed on the member 3 and engaged by the member 4, the U-shaped wires 26 and rods 33 will indent the dough slightly as shown by the cross marking in FIGURE 3. The rods 33 will tend to grip the outside of the taco to remove the taco from member 3 due to the pull being in alignment with the wires 26. The taco may then be removed from the member 4 by hand.

It will be obvious from the foregoing that I have provided an improved cooking utensil for tacos or the like simple and economical, and which accomplishes the purpose of forming and holding the tacos while cooking without being constantly watched by the user.

What I claim and desire to secure by Letters Patent is:

A holder for cooking a taco shell comprising, a pair of spaced elongated horizontally extending handle members joined at one end respectively thereof in a spring coil so that said handle members will normally be spaced apart and movable in the same plane, the other end of each of said handle members being turned laterally toward each other forming arms, said arms being turned laterally so as to extend in horizontal position substantially oppositely relative to said handle members, one of said laterally extending arms extending slightly upwardly over the other and then both of said arms being turned tubstantially vertically downwardly and terminating in substantially horizontally extending portions, said horizontally extending portions of said arms extending in the same planes as the respective vertical portions and laterally turned portions of said arms, first and second taco holding members secured respectively to said arms on said horizontally extending portions said holding members each being of substantially U-shape and the first member nesting within the second member when the holder is in normal position and both U-shaped members having spaced apart curved arms, U-shaped wires having their free ends secured on the outside of the spaced apart arms of the first nested holding member forming taco supporting surfaces, a pluarlity of spaced wires secured to the inside of said spaced arms of said member and running transversely to said wires on said first member, said first member being of smaller external dimension in side elevation than the internal dimension of said second member for nesting therein, said spring coil urging said members into nesting position, said members being horizontally separated by movement of said handle members toward each other for placement of the taco over the first member and release of said handle members will cause the second member to close over the taco and hold it in place on the first member during cooking and the wires on the second member gripping the taco when the handle members are moved toward each other to remove said taco from the first member.

References Cited in the file of this patent

UNITED STATES PATENTS

| | | |
|---|---|---|
| 385,498 | Brinton | July 3, 1888 |
| 466,057 | Campbell | Dec. 29, 1891 |
| 549,148 | McCallum | Nov. 5, 1895 |
| 2,635,528 | Torres | Apr. 21, 1953 |
| 2,719,480 | Prickett et al. | Oct. 4, 1955 |
| 2,775,929 | Johnson et al. | Jan. 1, 1957 |
| 2,778,294 | Ulloa | Jan. 22, 1957 |

FOREIGN PATENTS

| | | |
|---|---|---|
| 352,278 | France | Aug. 7, 1905 |
| 10,574 of 1907 | Great Britain | May 7, 1907 |
| 66,054 | Netherlands | June 16, 1950 |